US011921861B2

(12) United States Patent
Kesarwani et al.

(10) Patent No.: US 11,921,861 B2
(45) Date of Patent: Mar. 5, 2024

(54) PROVIDING THE STATUS OF MODEL EXTRACTION IN THE PRESENCE OF COLLUDING USERS

(71) Applicant: International Business Machines Corporation, Armonk, NY (US)

(72) Inventors: Manish Kesarwani, Bangalore (IN); Vijay Arya, Bangalore (IN); Sameep Mehta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1276 days.

(21) Appl. No.: 15/984,660

(22) Filed: May 21, 2018

(65) Prior Publication Data

US 2019/0354687 A1    Nov. 21, 2019

(51) Int. Cl.
*G06N 3/08* (2023.01)
*G06F 16/245* (2019.01)
*G06F 21/57* (2013.01)
*G06N 3/042* (2023.01)

(52) U.S. Cl.
CPC .......... *G06F 21/577* (2013.01); *G06F 16/245* (2019.01); *G06N 3/042* (2023.01); *G06N 3/08* (2013.01); *G06F 2221/033* (2013.01)

(58) Field of Classification Search
CPC ................................ G06N 3/0427; G06N 3/08
See application file for complete search history.

(56) References Cited

U.S. PATENT DOCUMENTS

| 8,838,578 | B2 | 9/2014 | Yoon et al. | |
|---|---|---|---|---|
| 9,092,802 | B1 | 7/2015 | Akella | |
| 2008/0104699 | A1* | 5/2008 | Gounares | G06F 9/468 |
| | | | | 726/25 |
| 2017/0063908 | A1 | 3/2017 | Muddu et al. | |

OTHER PUBLICATIONS

H. Xu, S. Guo and K. Chen, "Building Confidential and Efficient Query Services in the Cloud with RASP Data Perturbation," in IEEE Transactions on Knowledge and Data Engineering, vol. 26, No. 2, pp. 322-335, Feb. 2014, doi: 10.1109/TKDE.2012.251. (Year: 2013).*

(Continued)

*Primary Examiner* — Ann J Lo
*Assistant Examiner* — Fen Christopher Tamulonis
(74) *Attorney, Agent, or Firm* — Ryan, Mason & Lewis, LLP

(57) ABSTRACT

Methods, systems, and computer program products for providing the status of model extraction in the presence of colluding users are provided herein. A computer-implemented method includes generating, for each of multiple users, a summary of user input to a machine learning model; comparing the generated summaries to boundaries of multiple feature classes within an input space of the machine learning model; computing correspondence metrics based at least in part on the comparisons; identifying, based at least in part on the computed metrics, one or more of the multiple users as candidates for extracting portions of the machine learning model in an adversarial manner; and generating and outputting an alert, based on the identified users, to an entity related to the machine learning model.

7 Claims, 5 Drawing Sheets

(56) References Cited

OTHER PUBLICATIONS

Nilothpal Talukder and Sheikh Iqbal Ahamed. 2010. Preventing multi-query attack in location-based services.WiSec '10 Association for Computing Machinery, New York, NY, USA, 25-36. DOI:https://doi.org/10.1145/1741866.1741873 (Year: 2010).*

A. Sallam, E. Bertino, S. R. Hussain, D. Landers, R. M. Lefler and D. Steiner, "DBSAFE—An Anomaly Detection System to Protect Databases From Exfiltration Attempts," in IEEE Systems Journal, vol. 11, No. 2, pp. 483-493, Jun. 2017, doi: 10.1109/JSYST.2015.2487221. (Year: 2015).*

Hore, Bijit, et al. "Secure multidimensional range queries over outsourced data." The VLDB Journal 21.3 (2012): 333-358. (Year: 2012).*

M. Kirmse and U. Petersohn, "Large margin rectangle learning an alternative way to learn interpretable and representative models," 2011 International Conference of Soft Computing and Pattern Recognition (SoCPaR), 2011, pp. 161-166, doi: 10.1109/SoCPaR.2011.6089133. (Year: 2011).*

Quiring et al. "Fraternal Twins: Unifying Attacks on Machine Learning and Digital Watermarking" arxiv. [Published 2017][Retrieved Feb. 2022] <URL: https://arxiv.org/abs/1703.05561> (Year: 2017).*

Ali Inan, 2010. Private record matching using differential privacy. In <i>Proceedings of the 13th International Conference on Extending Database Technology EDBT '10 DOI https://doi.org/10.1145/1739041.1739059 (Year: 2010).*

Nicolas Papernot, 2017. Practical Black-Box Attacks against Machine Learning. In <i>Proceedings of the 2017 ACM on Asia Conference on Computer and Communications Security ASIA CCS '17 DOI:https://doi.org/10.1145/3052973.3053009 (Year: 2017).*

Zhu, Youwen et al. "Security Analysis of Collusion-Resistant Nearest Neighbor Query Scheme on Encrypted Cloud Data" IEICE vol. E97. No. 2 [Published 2014] [Retrieved Jul. 2022] <URL: https://www.jstage.jst.go.jp/article/transinf/E97.D/2/E97.D_326/_pdf> (Year: 2014).*

Malik, Tanu et al. "A Black-Box Approach to Query Cardinality Estimation" CIDR '07 [Published 2007] [Retrieved Jul. 2022] <URL: https://citeseerx.ist.psu.edu/viewdoc/download?doi=10.1.1.120.7163&rep=rep1&type=pdf> (Year: 2007).*

A. K. Chorppath, T. Alpcan and H. Boche, "Bayesian Mechanisms and Detection Methods for Wireless Network with Malicious Users," in IEEE Transactions on Mobile Computing, vol. 15, No. 10, pp. 2452-2465, Oct. 1, 2016, doi: 10.1109/TMC.2015.2505724. (Year: 2016).*

P. S. Wang, F. Lai, H.-C. Hsiao and J.-L. Wu, "Insider Collusion Attack on Privacy-Preserving Kernel-Based Data Mining Systems," in IEEE Access, vol. 4, pp. 2244-2255, 2016, doi: 10.1109/ACCESS.2016.2561019. (Year: 2016).*

Unnamed "Polynomial complexity" MathWiki, University of Tartu [Published 2014] [Retrieved Sep. 2023] <URL: https://mathwiki.cs.ut.ee/asymptotics/05_polynomial_complexity> (Year: 2014).*

U/gilgoomesh "Response to: What is Polynomial Time? (In Layman terms)" Reddit: r/askscience [Published 2013] [Retrieved Sep. 2023] <URL: https://www.reddit.com/r/askscience/comments/1n5467/what_is_polynomial_time_in_layman_terms/?rdt=39625> (Year: 2013).*

Unnamed "Polynomial time" NIST [Published 2004] [Retrieved Sep. 2023] <URL: https://xlinux.nist.gov/dads/HTML/polynomialtm.html #:~: text=Definition%3A%20When%20the%20execution%20time,where%20k%20is%20a%20constant. (Year: 2004).*

Terr, David "Polynomial Time" Wolfram MathWorld [Latest Version 2023] [Retrieved Sep. 2023] <URL: https://mathworld.wolfram.com/PolynomialTime.html> (Year: 2023).*

Tramèr et al., Stealing Machine Learning Models via Prediction APIs, Proceedings of the 25th USENIX Security Symposium, Aug. 2016.

* cited by examiner

PROVIDING THE STATUS OF MODEL EXTRACTION IN THE PRESENCE OF COLLUDING USERS

FIELD

The present application generally relates to information technology, and, more particularly, to machine learning (ML) model management.

BACKGROUND

Model extraction by adversarial and/or colluding users presents challenges for service owners with respect to security, revenues, etc. In the case of interpretable models such as linear regression and logistic regression, the number of calls needed to extract a model is a function of the number of model parameters. In the case of less interpretable models such as variants of decision trees and neural networks, challenges exist in quantifying the number of calls. However, when a machine learning model is deployed in the presence of adversaries attempting to extract the model, either by working independently or by colluding with others, existing management approaches fail to provide warnings about the status of extraction.

SUMMARY

In one embodiment of the present invention, techniques for determining the status of model extraction in the presence of colluding users are provided. An exemplary computer-implemented method can include generating, for each of multiple users, a summary of user input to a machine learning model, wherein each of the generated summaries is represented as a polyhedron in an n-dimensional space, wherein the n-dimensional space is defined based at least in part on (i) a number of query features related to the user input and (ii) a number of user-submitted queries. The method also includes comparing the polyhedra, representative of the generated summaries, to multiple feature class boundaries of the machine learning model, wherein the multiple feature class boundaries are represented as polyhedra formed by partitioning an input space of the machine learning model, computing one or more polyhedral correspondence metrics based at least in part on the comparing step, and identifying, based at least in part on the one or more computed polyhedral correspondence metrics, one or more of the multiple users as candidates for extracting one or more portions of the machine learning model in an adversarial manner. Further, the method includes generating and outputting an alert, based on the one or more identified users, to at least one entity related to the machine learning model.

In another embodiment of the invention, an exemplary computer-implemented method can include generating one or more combinations of two or more summaries via combining two or more of the corresponding polyhedra, and comparing the one or more combinations of the polyhedra, to multiple feature class boundaries of the machine learning model, wherein the multiple feature class boundaries are represented as polyhedra formed by partitioning an input space of the machine learning model. Such a method can also include computing one or more polyhedral correspondence metrics based at least in part on the comparing step, identifying, based at least in part on the one or more computed polyhedral correspondence metrics, one or more sets of users as candidates for colluding to extract one or more portions of the machine learning model in an adversarial manner, and generating and outputting an alert, based on the one or more identified sets of users, to at least one entity related to the machine learning model.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
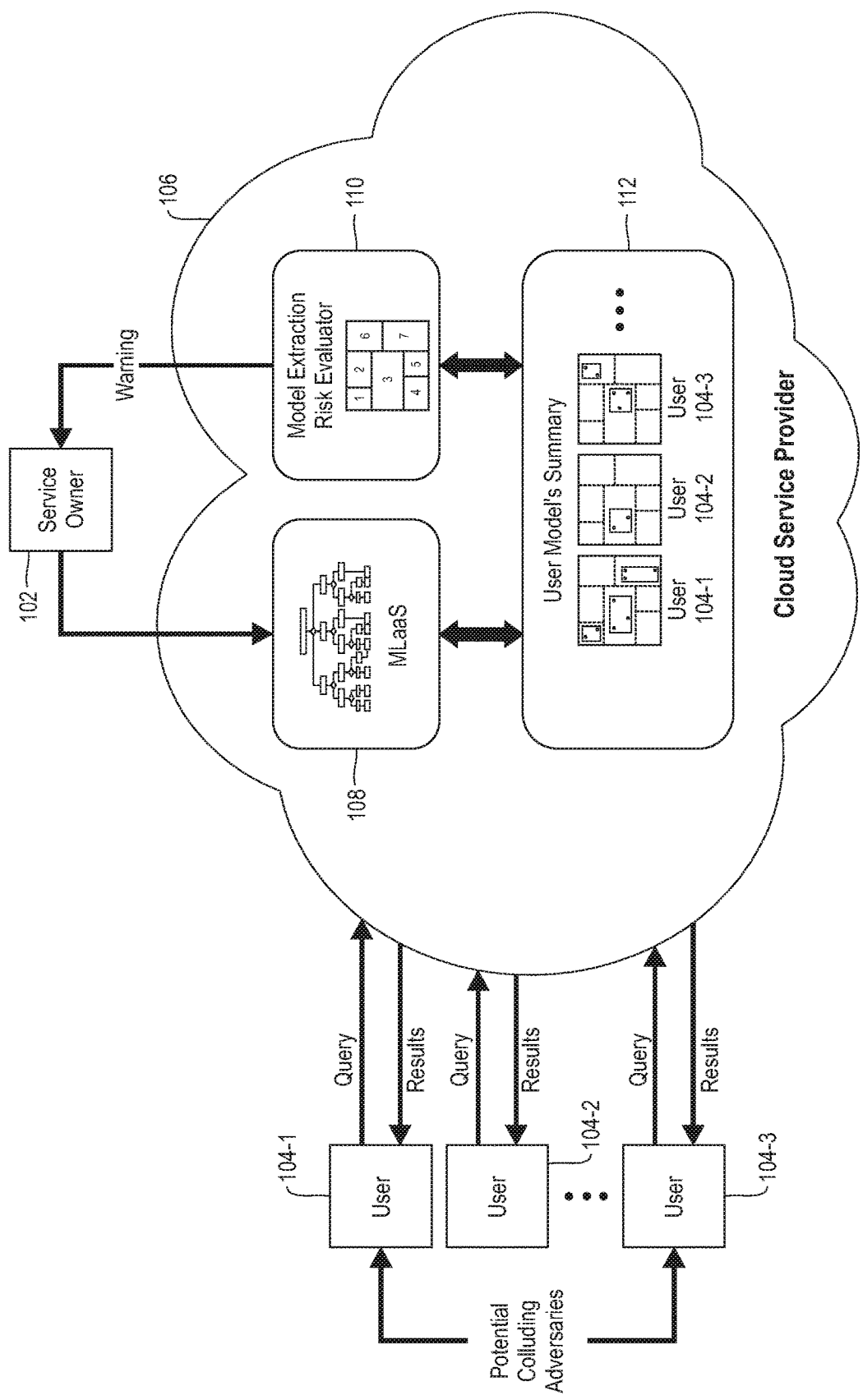
FIG. 1 is a diagram illustrating system architecture, according to an exemplary embodiment of the invention.

As described herein, an embodiment of the present invention includes providing the status of model extraction in the presence of colluding users. For example, such an embodiment can include providing output statistics and/or warnings related thereto to a service provider (such as a business enterprise), wherein such output statistics and/or warnings are generated by extracting status-related information pertaining to a deployed machine learning model across a community of potentially colluding users.

At least one embodiment of the invention includes generating and maintaining summaries of each user input stream across a community of potentially colluding users. A user's input (query) stream can include, for example, query and prediction response pairs. In one or more embodiments of the invention, such pairs can be represented using minimum bounding polyhedra, wherein the boundaries and/or faces of such polyhedra are parallel to feature dimensions. Additionally, such a summary polyhedron can be represented in the order of number of features instead of number of actual query points. Therefore, in such an embodiment, the storage space of the summary polyhedron and the time complexity needed to run operations on the summary polyhedron (combining multiple polyhedra, etc.) can be reduced.

In one or more embodiments of the invention, a user's query summary can be represented as a set of polyhedra, one polyhedron corresponding to each class to which the queries are mapped. As such, in such an embodiment, instead of maintaining a large list of user queries along with class labels, a compact summary representation based on polyhedra is maintained. For example, if the number of features=2, and the user has made 10 queries resulting in the same class label, then the summary would simply include a minimum bounding rectangle in the two-dimensional space. By way of example, a deployed model can include a spam classifier, which predicts whether an email is "Spam" or "Not Spam." In such an example "Spam" and "Not Spam" are two classes.

Additionally, one or more embodiments of the invention can include combining such generated summaries across different users and/or comparing such generated summaries against one or more class boundaries within an input space of the original deployed machine learning model. In such embodiments, machine learning models can include decision trees (DT) and/or neural networks (NN). Also, as used herein, a class boundary divides the input feature space of a model into various classes, and the model can use these classes to generating one or more predictions. By way of example, for any input email, the model may predict the class to which the particular input belongs ("Spam" or "Not Spam"). For neural networks, such classes can take the form, for example, of non-linear shapes. Additionally, in one or more embodiments of the invention utilizing neural networks, model distilling approaches can be implemented to convert the neural network into a decision tree. For decision trees, classes are generally represented as polyhedra.

Additionally, at least one embodiment of the invention includes computing metrics based at least in part on the generated summaries of the user query streams. Such metrics can include, for example, a coverage and boundary distance within each class label, which can be used to generate and output statistics of model extraction across a community of potentially colluding users.

One or more embodiments of the invention also include identifying a set of potentially colluding users (within a community of users) having maximum overall knowledge of the model, determining the overall model extraction vulnerability of the deployed machine learning as a service (MLaaS) in the presence of colluding users, and generating and providing group-specific warnings (which can be used, for example, as input to model pricing functions). As used herein, colluding users refers to users who may actively collaborate to intelligently generate input queries. For example, if there were five classes and five users, each user can generate specialized queries for each separate class. Independently, the users likely have less knowledge of the model than the totality of the users have in combination. In contrast, users who may have knowledge of the model may actively collaborate to generate specialized queries to increase coverage and complement each other. Accordingly, by way of example, a warning generated by one or more embodiments of the invention might include the following: 80% of model can be extracted by User1 and User3. By way of further example, a generated warning can include a number that represents the percentage of the model learnt by individual or colluding users.

In at least one embodiment of the invention, a server can check and/or determine the overlap of user polyhedra with polyhedra formed by the partitioning of the input space with respect to the originally deployed model. In such an embodiment, the server can also combine the polyhedra of users to determine the largest bounding joint polyhedron for each class label. Additionally, for a given set of suspected (colluding) users, one or more embodiments of the invention includes computing a joint summary of the users (which can be represented as a polyhedron for each class label) and determining the amount of knowledge possessed by the users about the model. At least one embodiment of the invention can include computing the knowledge of individual users by using the polyhedra formed by the users' respective input queries for each class. Additionally, at least one embodiment of the invention can include computing the knowledge of individual users by computing the joint knowledge of a group of potential colluding users, and using the aggregate knowledge of the group as a basis for knowledge of the individual users in the group.

Further, in one or more embodiments of the invention, a server can combine the summary polyhedra of users (of a given community of users) within each of multiple class labels to determine the largest bounding joint polyhedron for each class label. Additionally, such an embodiment can include computing (via a fast polynomial time step) a statistic and/or metric based on the aggregate overlap of such a joint polyhedron. Such a metric can also include, for example, the calculated aggregate overlap of the user's polyhedron and the model's polyhedron, or the calculated distance of a user's polyhedron's boundaries from the model's decision boundary. The coverage of a user's polyhedron for a class can be computed by dividing the hypervolume of the user's polyhedron for a class with respect to the hypervolume of the model's polyhedron for that class: Coverage_for_class1=User's hypervolume for class1/Model's hypervolume for class1.

As detailed herein, at least one embodiment of the invention includes determining the minimum number of potentially colluding users who have maximum knowledge of the deployed model. For each class label, such an embodiment includes determining the set of users that have maximum knowledge of the deployed model. In such an embodiment, because summary polyhedron boundaries are parallel to the feature axes, determining the set of users that have maximum knowledge of the deployed model can be carried out by using a minimum function and a maximum function across all users along each feature axis. By way merely of illustration, consider an example wherein the number of features is two. In such an example, each user's summary for a class can be represented using a rectangle and can be stored using the upper-left corner and the lower-right corner coordinates. For example, assume that User1's summary= [(U1X1, U1Y1), (U1X2, U1Y2)], and User2's summary= [(U2X1, U2Y1), (U2X2, U2Y2)]. In such an instance, the combined summary of two users can be computed using the minimum and maximum function as follows: Combined summary=[(min(U1X1, U2X1), max(U1Y1, U2Y1)), (max (U1X2, U2X2), min(U1Y2, U2Y2))].

Additionally, in determining the minimum number of potentially colluding users who have maximum knowledge of the deployed model, one or more embodiments of the invention can include combining the determined user sets (detailed in the above paragraph) for each class label and identifying the set of users having the most (that is, maximum) knowledge of the deployed model. Based on metrics such as, for example, the calculated aggregate overlap of each joint polyhedron, and the calculated distance of a user's polyhedron's boundaries from the model's decision boundary, the knowledge of the obtained user set can be determined.

Accordingly, such an embodiment can (via a server, for example) run the above-noted steps (for determining the minimum number of potentially colluding users who have maximum knowledge of the deployed model) periodically and track the minimum user set that has maximum knowledge about the deployed model in polynomial time (for example, via (number of features)*(class labels)). Further, in one or more embodiments of the invention, the above-noted steps (for determining the minimum number of potentially colluding users who have maximum knowledge of the deployed model) can be applied to each disjoint region of the model versus each class label.

At least one embodiment of the invention can also include generalizing one or more of the techniques described herein to other models and decision boundaries. For example, the technique to determine the minimum number of users who have maximum knowledge of the model can be generalized for other linear shapes in high dimensions (for example, shapes that may not have all boundaries parallel to feature axes). Additionally, for arbitrary-shaped decision boundaries, one or more embodiments of the invention can include reducing a query to a set multi-cover problem and determining an approximate number of users. Also, for models such as neural networks, etc., at least one embodiment of the invention can include maintaining approximately equivalent yet simpler models, and using the information of such models to generate and output approximate statistics on the status of model extraction in the presence of colluding users. Accordingly, using the above-noted methods, one or more embodiments of the invention can include analyzing a threat posed by any specific set (or sub-set) of users.

FIG. 1 is a diagram illustrating system architecture, according to an embodiment of the invention. By way of illustration, FIG. 1 depicts a service owner 102 (such as a business enterprise, etc.), a cloud service provider 106, and potentially colluding users/adversaries that include user 104-1, user 104-2 and user 104-3. Additionally, the cloud service provider 106 includes a MLaaS component 108, a model extraction risk evaluator 110, and a user model summary component 112. As depicted in FIG. 1, user 104-1, user 104-2, and user 104-3 all provide queries to the cloud service provider 106, and all receive results from the cloud service provider 106 in response. Also, the service owner 102 trains a ML model over its proprietary dataset and deploys that model over cloud service provider 106 (via the MLaaS component 108), and based at least upon such a model deployment, the model extraction risk evaluator 110 generates and outputs a warning to the service owner. By way of example, such a warning might indicate that 80% of the deployed model can be extracted by the combination of user 104-1 and user 104-3.

More specifically, the MLaaS component 108 receives input queries from users 104-1, 104-2 and 104-3, passes such queries to the deployed ML model from service owner 102, and generates and forwards responses to the respective user. The user model summary component 112 monitors each user query and creates summaries attributed thereto. Further, the model extraction risk evaluator component 110 uses the user model summaries generated by the user model summary component 112, computes a coverage and/or boundary distance metric related thereto, and additionally generates and forwards any relevant model extraction warning (related to the computed metric(s) to the service owner 102.

In accordance with one or more embodiments of the invention, by continuously studying the state of model extraction, user queries can be priced in a variable manner such that, for example, a user is charged a higher amount when the user's knowledge of the model increases, or all users are charged less when it becomes known that the knowledge of the model is widely available within the community of users. Such information pertaining to the state of model extraction can also be used, for example, to downgrade the service for suspicious users who may be colluding, as determined via one or more of the techniques detailed herein.

Figure 2:
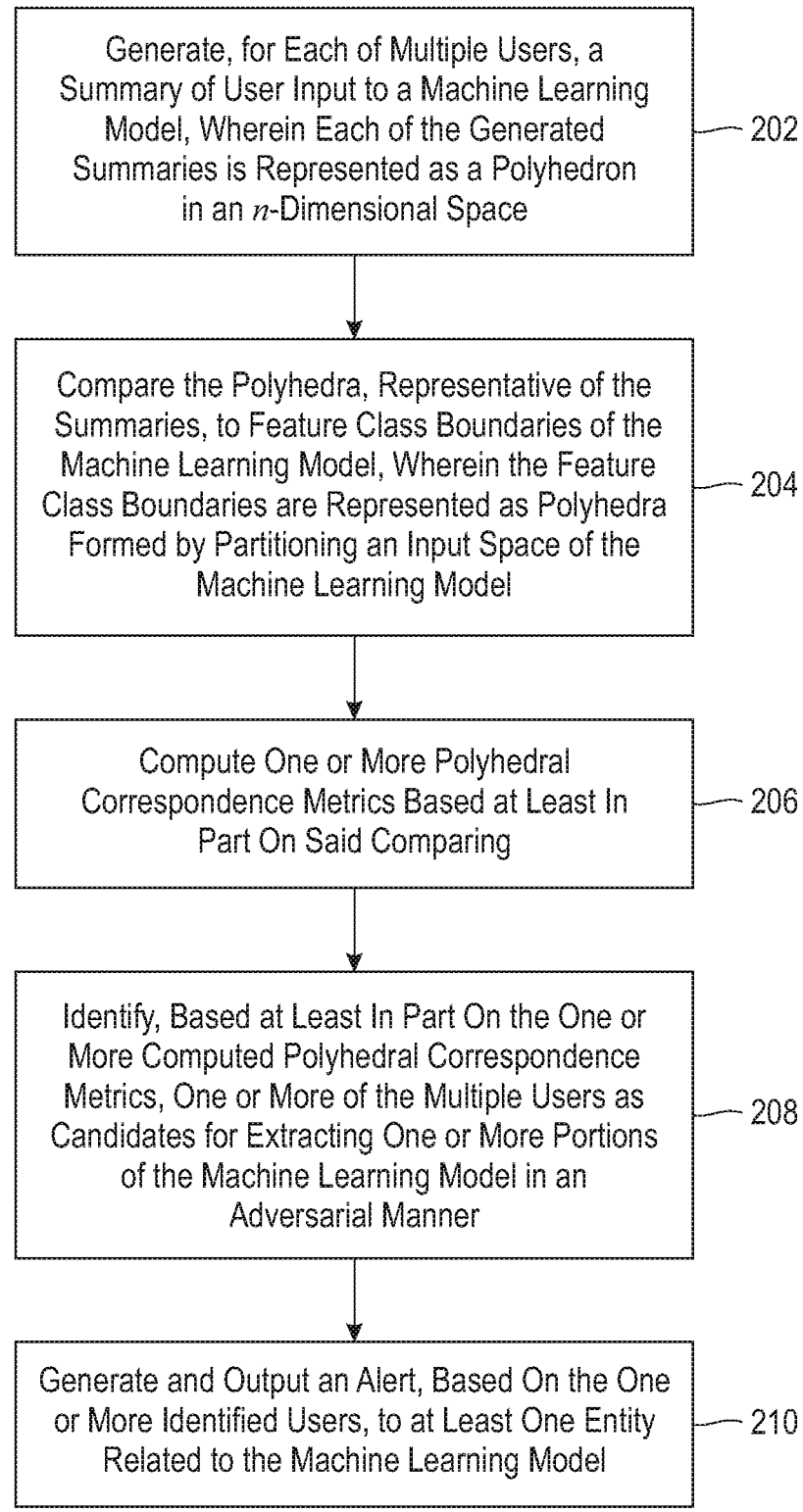
FIG. 2 is a flow diagram illustrating techniques according to an embodiment of the invention.

FIG. 2 is a flow diagram illustrating techniques according to an embodiment of the present invention. Step 202 includes generating, for each of multiple users, a summary of user input to a machine learning model, wherein each of the generated summaries is represented as a polyhedron in an n-dimensional space, wherein the n-dimensional space is defined based at least in part on (i) a number of query features related to the user input and (ii) a number of user-submitted queries. The machine learning model can include a decision tree, a neural network, etc. Additionally, the user input to the machine learning model can include one or more queries.

Step 204 includes comparing the polyhedra, representative of the generated summaries, to multiple feature class boundaries of the machine learning model, wherein the multiple feature class boundaries are represented as polyhedra formed by partitioning an input space of the machine learning model. Step 206 includes computing one or more polyhedral correspondence metrics based at least in part on said comparing. The polyhedral correspondence metrics can include a coverage metric pertaining to coverage of one or more of the multiple feature classes by one or more of the generated summaries. Also, the metrics can include a boundary distance metric pertaining to a calculated distance between one or more boundaries of the generated summaries and one or more of the boundaries of the multiple feature classes within the input space of the machine learning model.

Step 208 includes identifying, based at least in part on the one or more computed polyhedral correspondence metrics, one or more of the multiple users as candidates for extracting one or more portions of the machine learning model in an adversarial manner. In one or more embodiments of the invention, the above-noted polyhedral correspondence metrics can indicate a user's knowledge of the machine learning model, and the identifying step can include identifying the one or more users determined to have the most knowledge of the machine learning model. Also, at least one embodiment of the invention can include determining, based at least in part on the one or more computed polyhedral correspondence metrics, overall model extraction vulnerability of the machine learning model with respect to the multiple users.

Step 210 includes generating and outputting an alert, based on the one or more identified users, to at least one entity related to the machine learning model. At least one embodiment of the invention can also include using the alert as an input to one or more pricing functions for the machine learning model.

Also, an additional embodiment of the invention includes generating one or more combinations of two or more summaries via combining two or more of the corresponding polyhedra, and comparing the one or more combinations of the polyhedra, to multiple feature class boundaries of the machine learning model, wherein the multiple feature class boundaries are represented as polyhedra formed by partitioning an input space of the machine learning model. Such an embodiment can also include computing one or more polyhedral correspondence metrics based at least in part on said comparing, identifying, based at least in part on the one or more computed polyhedral correspondence metrics, one or more sets of users as candidates for colluding to extract one or more portions of the machine learning model, and generating and outputting an alert, based on the one or more identified sets of users, to at least one entity related to the machine learning model.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
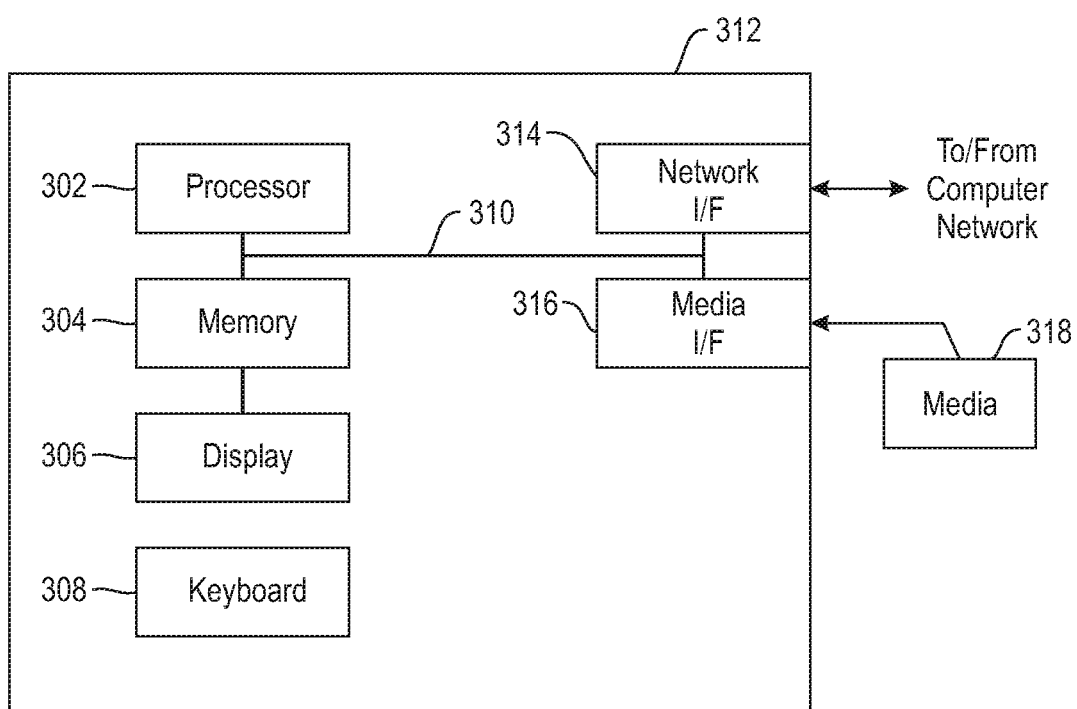
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
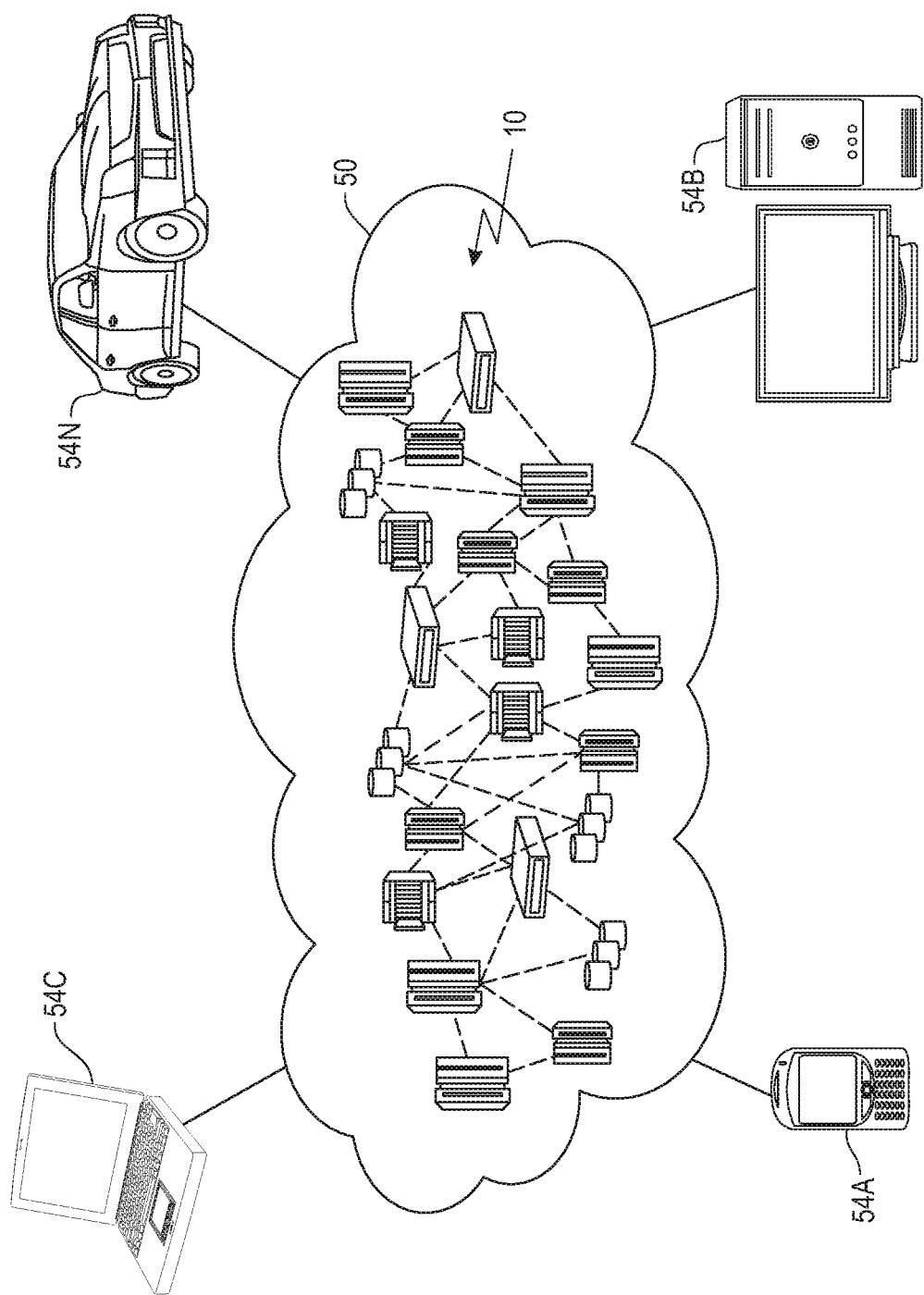
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
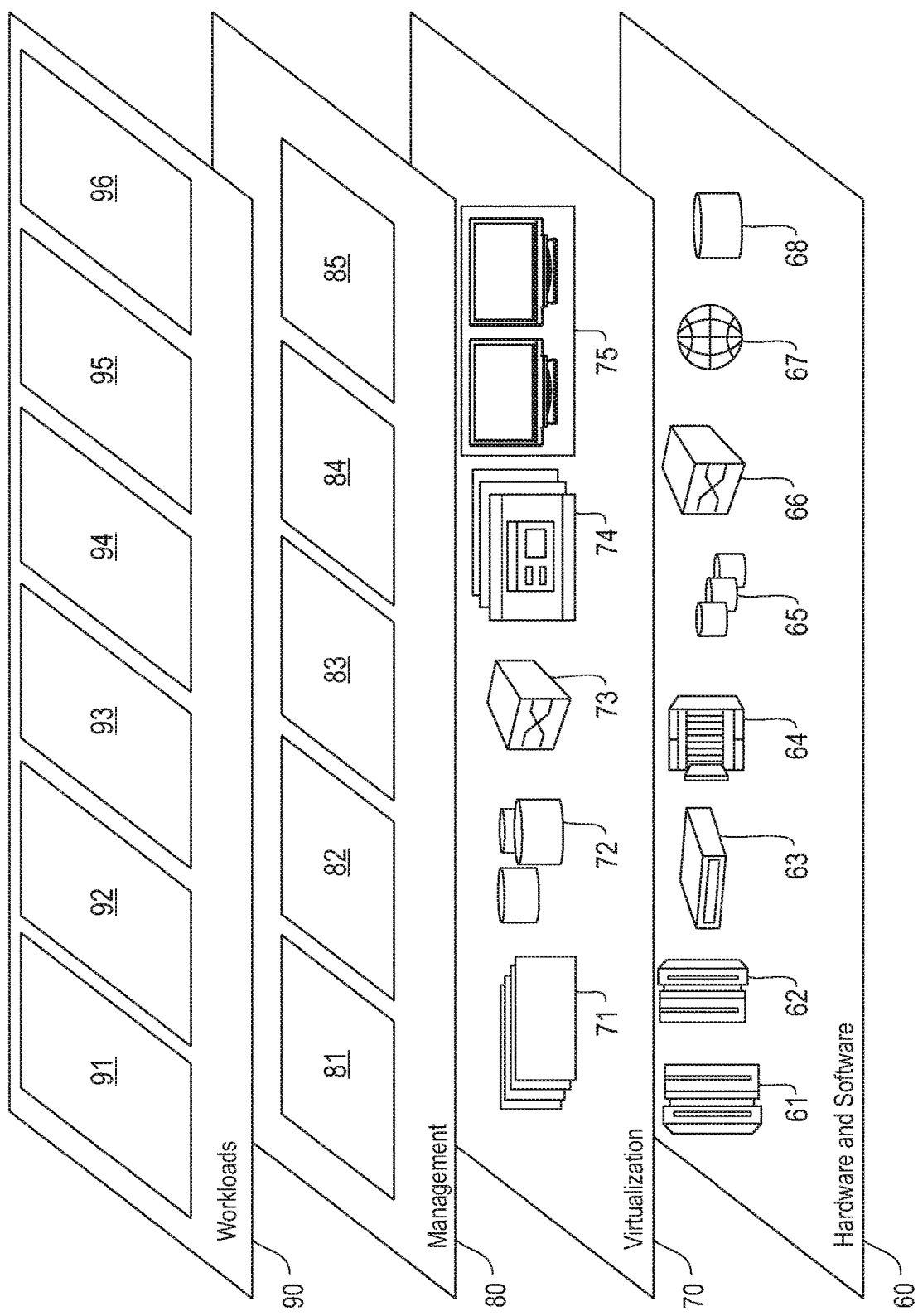
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model extraction status determination 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, deploying MLaaS in the presence of colluding users and providing group-specific warnings as an input to model-pricing functions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   generating, for each of multiple users, a summary of user input to a machine learning model, wherein each of the generated summaries is represented as a polyhedron in an n-dimensional space, wherein the polyhedra comprise minimum bounding polyhedra and are designed to reduce storage space needs and time complexity by representing user-submitted query and query-response pairs using the polyhedra, wherein faces of the polyhedral are minimized to match, in number, query feature dimensions in the n-dimensional space, wherein the n-dimensional space comprises three or more dimensions and is defined based at least in part on a number of query features related to the user input, and wherein generating the summary is carried out in connection with processing the user input using the machine learning model and generating one or more machine learning model outputs in response to the user input, wherein generating the one or more machine learning model outputs comprises determining one of multiple query feature classes into which the user input is classified, and wherein the multiple query feature classes are represented using the polyhedra;
   generating one or more combinations of two or more summaries via combining two or more of the corresponding polyhedra;
   comparing the one or more combinations of the polyhedra, to multiple feature class boundaries of the machine learning model, wherein the multiple feature class boundaries are represented as polyhedra formed by partitioning an input space of the machine learning model;
   computing, in polynomial time, one or more polyhedral correspondence metrics based at least in part on said comparing, wherein computing the one or more polyhedral correspondence metrics comprises at least one of calculating aggregate overlap of the polyhedra associated with the multiple users and the polyhedra associated with the machine learning model, and calculating distance of boundaries of the polyhedra associated with the multiple users from one or more decision boundaries of the machine learning model;
   identifying, based at least in part on the one or more computed polyhedral correspondence metrics, two or more of the multiple users as candidates for extracting, together in collaboration, one or more portions of the machine learning model in an adversarial manner;
   generating and outputting an alert, based on the two or more identified users, to at least one entity related to the machine learning model, wherein the alert comprises an amount of the machine learning model that can be extracted by the two or more identified users in collaboration; and
   automatically modifying at least one pricing function associated with the machine learning model in response to the identification of the two or more users as candidates for extracting one or more portions of the machine learning model in an adversarial manner;
   wherein the method is carried out by at least one computing device comprising a processor coupled to a memory; and
   wherein the machine learning model is implemented by the processor and the memory of the at least computing device.

2. The computer-implemented method of claim 1, wherein the machine learning model comprises a decision tree.

3. The computer-implemented method of claim 1, wherein the machine learning model comprises a neural network.

4. The computer-implemented method of claim 1, wherein the user input to the machine learning model comprises one or more queries.

5. A computer program product comprising a computer readable storage medium having program instructions embodied therewith, the program instructions executable by a computing device, comprising a processor coupled to a memory, to cause the computing device to:
   generate, for each of multiple users, a summary of user input to a machine learning model, wherein each of the generated summaries is represented as a polyhedron in an n-dimensional space, wherein the polyhedra comprise minimum bounding polyhedra and are designed to reduce storage space needs and time complexity by representing user-submitted query and query-response pairs using the polyhedra, wherein faces of the polyhedral are minimized to match, in number, query feature dimensions in the n-dimensional space, wherein the n-dimensional space comprises three or more dimensions and is defined based at least in part on a number of query features related to the user input, and wherein generating the summary is carried out in connection with processing the user input using the machine learning model and generating one or more machine learning model outputs in response to the user input, wherein generating the one or more machine learning model outputs comprises determining one of multiple query feature classes into which the user input is classified, and wherein the multiple query feature classes are represented using the polyhedra;

generate one or more combinations of two or more summaries via combining two or more of the corresponding polyhedra;

compare the one or more combinations of the polyhedra, to multiple feature class boundaries of the machine learning model, wherein the multiple feature class boundaries are represented as polyhedra formed by partitioning an input space of the machine learning model;

compute, in polynomial time, one or more polyhedral correspondence metrics based at least in part on said comparing, wherein computing the one or more polyhedral correspondence metrics comprises at least one of calculating aggregate overlap of the polyhedra associated with the multiple users and the polyhedra associated with the machine learning model, and calculating distance of boundaries of the polyhedra associated with the multiple users from one or more decision boundaries of the machine learning model;

identify, based at least in part on the one or more computed polyhedral correspondence metrics, two or more of the multiple users as candidates for extracting, together in collaboration, one or more portions of the machine learning model in an adversarial manner;

generate and output an alert, based on the two or more identified users, to at least one entity related to the machine learning model, wherein the alert comprises an amount of the machine learning model that can be extracted by the two or more identified users in collaboration; and automatically modify at least one pricing function associated with the machine learning model in response to the identification of the two or more users as candidates for extracting one or more portions of the machine learning model in an adversarial manner.

6. The computer program product of claim 5, wherein the machine learning model comprises at least one of (i) a decision tree and (ii) a neural network.

7. A system comprising:

at least one processing device comprising a processor coupled to a memory; and the at least one processing device configured for:

generating, for each of multiple users, a summary of user input to a machine learning model, wherein each of the generated summaries is represented as a polyhedron in an n-dimensional space, wherein the polyhedra comprise minimum bounding polyhedra and are designed to reduce storage space needs and time complexity by representing user-submitted query and query-response pairs using the polyhedra, wherein faces of the polyhedral are minimized to match, in number, query feature dimensions in the n-dimensional space, wherein the n-dimensional space comprises three or more dimensions and is defined based at least in part on a number of query features related to the user input, and wherein generating the summary is carried out in connection with processing the user input using the machine learning model and generating one or more machine learning model outputs in response to the user input, wherein generating the one or more machine learning model outputs comprises determining one of multiple query feature classes into which the user input is classified, and wherein the multiple query feature classes are represented using the polyhedra;

generating one or more combinations of two or more summaries via combining two or more of the corresponding polyhedra;

comparing the one or more combinations of the polyhedra, to multiple feature class boundaries of the machine learning model, wherein the multiple feature class boundaries are represented as polyhedra formed by partitioning an input space of the machine learning model;

computing, in polynomial time, one or more polyhedral correspondence metrics based at least in part on said comparing, wherein computing the one or more polyhedral correspondence metrics comprises at least one of calculating aggregate overlap of the polyhedra associated with the multiple users and the polyhedra associated with the machine learning model, and calculating distance of boundaries of the polyhedra associated with the multiple users from one or more decision boundaries of the machine learning model;

identifying, based at least in part on the one or more computed polyhedral correspondence metrics, two or more of the multiple users as candidates for extracting, together in collaboration, one or more portions of the machine learning model in an adversarial manner;

generating and outputting an alert, based on the two or more identified users, to at least one entity related to the machine learning model, wherein the alert comprises an amount of the machine learning model that can be extracted by the two or more identified users in collaboration; and automatically modifying at least one pricing function associated with the machine learning model in response to the identification of the two or more users as candidates for extracting one or more portions of the machine learning model in an adversarial manner.

\* \* \* \* \*